(12) United States Patent
Ström et al.

(10) Patent No.: US 8,998,583 B2
(45) Date of Patent: Apr. 7, 2015

(54) GAS TURBINE ENGINE AND A GAS TURBINE ENGINE COMPONENT

(75) Inventors: Linda Ström, Trollhättan (SE); Fredrik Wallin, Vänersborg (SE); Tomas Fernström, Göteborg (SE)

(73) Assignee: GKN Aerospace Sweden AB, Trollhattan (SE)

( * ) Notice: Subject to any disclaimer, the term of this patent is extended or adjusted under 35 U.S.C. 154(b) by 1027 days.

(21) Appl. No.: 12/994,798

(22) PCT Filed: May 27, 2008

(86) PCT No.: PCT/SE2008/000356
§ 371 (c)(1),
(2), (4) Date: Jan. 31, 2011

(87) PCT Pub. No.: WO2009/145679
PCT Pub. Date: Dec. 3, 2009

(65) Prior Publication Data
US 2011/0299980 A1     Dec. 8, 2011

(51) Int. Cl.
| F01D 9/00  | (2006.01) |
| F01D 25/16 | (2006.01) |
| F01D 25/24 | (2006.01) |
| F02D 9/02  | (2006.01) |
| F02M 35/10 | (2006.01) |

(52) U.S. Cl.
CPC .............. *F01D 25/162* (2013.01); *F01D 25/24* (2013.01); *F02D 9/02* (2013.01); *F02M 35/10301* (2013.01); *Y02T 50/671* (2013.01)

(58) Field of Classification Search
USPC .............. 416/204 R, 210 A, 214 A; 415/142, 415/211.2, 191
See application file for complete search history.

(56) References Cited

U.S. PATENT DOCUMENTS

| 3,528,752 A | * | 9/1970 | Chilman et al. | ............... 415/130 |
| 3,735,593 A | * | 5/1973 | Howell | ......................... 60/226.1 |

(Continued)

FOREIGN PATENT DOCUMENTS

| DE | 3707437 A1 | * | 3/1988 |
| GB | 1506952 A |   | 4/1978 |

OTHER PUBLICATIONS

International Search Report for corresponding International Application PCT/SE2008/000356.

(Continued)

*Primary Examiner* — Edward Look
*Assistant Examiner* — Danielle M Christensen
(74) *Attorney, Agent, or Firm* — Bejin Bieneman PLC

(57) ABSTRACT

A gas turbine engine component providing a gas flow passage is provided, which gas flow passage surrounds an inner passage surface, an outer passage surface forming an outer delimitation of said gas flow passage. In an aspect, the trace of the inner passage surface in a cross-section perpendicular to a central axis of the component presents at least one substantially straight portion. In another aspect, where a plurality of circumferentially spaced blades extends between the inner and outer passage surfaces, two portions of the trace, in a cross-section perpendicular to a central axis of the component, of the outer passage surface between two adjacent blades are substantially straight and oriented in an angle in relation to each other so as to form a concavity in the gas flow passage.

19 Claims, 12 Drawing Sheets

(56) References Cited

U.S. PATENT DOCUMENTS

| | | | |
|---|---|---|---|
| 4,492,078 A | | 1/1985 | Williamson |
| 4,863,352 A | | 9/1989 | Hauser et al. |
| 5,108,259 A | | 4/1992 | Wakeman et al. |
| 5,263,898 A | * | 11/1993 | Elston et al. .................. 416/147 |
| 5,743,713 A | * | 4/1998 | Hattori et al. .................. 416/215 |
| 6,041,589 A | * | 3/2000 | Giffin et al. .................. 60/226.1 |

OTHER PUBLICATIONS

International Preliminary Report on Patentability for corresponding International Application PCT/SE2008/000356.

Gregory-Smith D. G., Ingram G., Jayaraman, P., Harvey N. W., Rose M. G., Proceedings of the I MECH E Part A, Journal of Power and Energy, vol. 215, No. 6, Dec. 2, 2001, pp. 721-734.

* cited by examiner

GAS TURBINE ENGINE AND A GAS TURBINE ENGINE COMPONENT

BACKGROUND AND SUMMARY

The present invention relates to a gas turbine engine and a gas turbine engine component. One aspect of the invention relates to the gas turbine engine component presenting an inner passage surface adapted to be surrounded by and to form a delimitation of a gas flow passage. Another aspect of the invention relates to the gas turbine engine component being adapted to provide a gas flow passage for at least a part of a gas flow through the gas turbine engine, which gas flow passage surrounds an inner passage surface, an outer passage surface forming an outer delimitation of said gas flow passage, a plurality of circumferentially spaced blades extending between the inner and outer passage surfaces.

In a gas turbine engine there are gas flow passages or ducts formed between an inner part and an outer part, surrounding the inner part. Often blades, in the form of struts or vanes are located in such passages, at which they are circumferentially distributed and extend between the inner and outer parts. The design of such passages is important for reasons of aerodynamic efficiency of the engine. For example, in known art, a lot of studies have been carried out concerning the design of end walls, herein also referred to as inner and outer passage surfaces, presented by such inner and outer parts, facing towards the gas flow passage, and at least partly extending between blades or vanes in turn extending between the inner and outer part. For example, testing of a cascade with an end wall with a concave curvature near the blade suction surface is disclosed in "Non-axisymmetric End turbine end wall profiling", Gregory-Smith D. G., Ingram G., Jayaraman, P., Harvey N. W., Rose M. G., Proceedings of the 1 MECH E Part A, Journal of Power and Energy, Vol. 215, Number 6, 2 Dec. 2001, pp. 721-734.

While studies of known art are focused on aerodynamic qualities of the passages, often the solutions provided are less than optimal regarding other requirements, such as manufacturing requirements, and structural characteristic requirements.

It is desirable to make the manufacturing of gas turbine engines easier.

According to an aspect of the invention, a gas turbine engine component is provided comprising an inner passage surface adapted to be surrounded by and to form a delimitation of a gas flow passage, wherein the trace of the inner passage surface in a cross-section perpendicular to a central axis of the component presents at least one substantially straight portion.

The central axis of the gas turbine engine component would normally be such that in a mounted state of the component in an engine, it coincides with an axis of rotation of at least one rotatable portion for the operation of a turbine assembly and a compressor assembly, located, in relation to a gas flow through the engine, downstream and upstream, respectively, of a combustion chamber.

Here, the trace portion of the inner passage surface being substantially straight means that it is straight, or that it deviates slightly from being straight in a manner that can be expected in practical use, for example due to deformation caused by manufacturing tolerances or thermal stresses.

The straight portion(s) of the trace of the inner passage surface provides, where the part presenting the inner passage surface is not divided into sections, better properties for thermal expansion, and, where the part presenting the inner passage surface is divided into sections, a simplified geometry for the joints between the sections, which in turn simplifies sealing between the inner part sections. Thus, the invention simplifies manufacturing of gas turbine engines.

Round shapes used in known solutions favour thermal stresses. The straight trace portion(s) of the inner passage surface provides for reduced risks of high thermal stresses. Thereby the structural performance of the part presenting the inner passage surface is increased. Such increase in the structural performance in turn provides for increasing the life of this part.

Preferably, the inner passage surface presents, in said cross-section, at least two substantially straight trace portions which have different extension directions. In yet more preferred embodiments, the inner passage surface has a polygonal shape. Thereby, the polygonal shape will be formed at least in said cross-section as a result of trace of the inner passage surface in the cross-section presenting a plurality of substantially straight portions.

Preferably, a plurality of circumferentially spaced blades extend from the inner passage surface. Preferably, at least one of the blades is located at an end point of a straight trace portion. In yet more preferred embodiments, at least one of the blades is located at a point of intersection between two adjacent substantially straight trace portions. Here, a blade being located at an end point of a straight trace portion means that it can be located on, close to, or in the vicinity of the end point. Similarly, a blade being located at a point of intersection between two adjacent substantially straight trace portions means that it can be located on, close to, or in the vicinity of the point of intersection.

Thereby gas flow passage portions between adjacent blades will, compared to traditional designs where the inner passage surface forms, in a cross-section perpendicular to said axis of rotation, a circular shape, have its cross-sectional area distributed more towards the region half-way between the blades. This will change the pressure distribution in the gas flow passage so as to reduce the risk of flow separation against delimitations of the gas flow passage. In other words, the gas flow passage cross-sectional area will be more concentrated to a central region between blades, which will change the pressure distribution in an advantageous manner so as to reduce secondary flow losses, especially at the blade roots. Thus, a gas turbine engine with improved aerodynamic qualities for gas flows, particularly for internal gas flows, will be provided.

It should be noted that the blades can be any sort in blades in the gas flow of the engine, for example turbine or compressor rotor blades, turbine or compressor stator vanes, or structural struts. More generally, the blades can be load-carrying, for example as struts, or not load-carrying, and the invention is applicable regardless whether the blades are adapted to redirect the gas flow.

In addition, the concentration of the passage cross-sectional area to a central region between blades will allow for the blade roots to be positioned further away from the axis of rotation of the engine. This will provide more space in an inside compartment, for example for oil conduits or air conduits, and it will also make assembly of the engine easier.

As further exemplified below, preferably a first and second angle between respective straight portions, at said cross-section, of the inner passage surface, on either side of the respective blade, and a straight line parallel to the spanwise direction of the respective blade, are both obtuse. As a result, the risk of flow separation at a region of intersection between the respective blade and the inner passage surface will be reduced. More specifically, in traditional designs, for example where the inner passage surface forms, in a cross-section perpendicular to said axis of rotation, a circular shape, said angles between the blades and the inner passage surface will be essentially right angles, or alternatively, one of them will be sharp. Such right and sharp angles will contribute to the stimulation of flow separation between the blade portion of maximum thickness and the blade trailing edge, where the gas flow decelerates. Opening said angles between the blades and the inner passage surface so as to be obtuse, reduces the risk of flow separation at the region of intersection between the respective blade and the inner passage surface.

As also mentioned below, the decreased risk of separation provides a special advantage where the gas flow passage is designed to provide diffusion, i.e. a decrease in the gas velocity, in that the passage can be designed so as to be shorter, contributing to reducing the length and weight of the engine.

Preferably, where at least one of the blades is located at an end point of a straight trace portion, and/or where at least one of the blades is located at a point of intersection between two adjacent substantially straight trace portions, the at least one straight trace portion of the inner passage surface is provided at all cross-sections, perpendicular to said central axis, along the entire blade in the direction of said central axis. This will further secure the aerodynamic benefits mentioned above.

Preferably, the engine comprises an inner part and an outer part forming between them the gas flow passage, which gas flow passage surrounds the inner part, the inner part presenting the inner passage surface. Thereby, the gas flow passage can present a generally circular shape as seen in a cross-section perpendicular to said axis of rotation. Also, thereby, where the circumferentially distributed blades are provided, they each extend between the inner and outer part.

In preferred embodiments, the inner passage surface presents in said cross-section a plurality of crests, and said at least one substantially straight portion of the trace is positioned between two adjacent crests. As exemplified below, said crests can form ridges extending at least partly in the direction of said axis of rotation, and blades can be located at the crests, i.e. on or in the vicinity of the crests. It should be noted that at intersections of adjacent straight trace portions, only one crest might be provided. However, for example where a relatively small concavity is provided at the intersection, which concavity extends mainly in the gas flow direction, two crests can be provided, each forming a ridge extending on a respective side of the concavity.

As exemplified below with reference to FIG. 7, preferably, a major part of the trace, at said cross-section, of the inner passage surface between any of two adjacent crests is substantially straight.

As exemplified below with reference to FIG. 8, preferably, ridges, forming said crests at said cross-section, are oriented in an angle to a plane being parallel with said axis of rotation. Preferably, said ridges are curved so that the angle of the local orientation of the ridges varies in the direction which is parallel to the axis of rotation.

In one embodiment, the inner passage surface forms an external surface of a hub for a propeller for a turboprop engine, or a hub for external blades for an unducted fan (UDF) or an open rotor.

According to another aspect of the invention, a gas turbine engine component is adapted to provide a gas flow passage for at least a part of a gas flow through the gas turbine engine, which gas flow passage surrounds an inner passage surface, an outer passage surface forming an outer delimitation of said gas flow passage, a plurality of circumferentially spaced blades extending between the inner and outer passage surfaces, wherein two portions of the trace, in a cross-section perpendicular to a central axis of the component, of the outer passage surface between two adjacent blades are substantially straight and oriented in an angle in relation to each other so as to form a concavity in the gas flow passage.

As exemplified below, the gas flow passage can be formed by an inner part and an outer part forming between them the gas flow passage and presenting the inner and outer passage surfaces, respectively. Also, the gas flow passage can surround the inner part so as to present a generally circular shape as seen in a cross-section perpendicular to said axis of rotation.

The advantages at manufacturing, mentioned above, are provided also at this aspect of the invention; i.e. the straight portions of the outer passage surface provide, where the part presenting the outer passage surface is not divided into sections, better properties for thermal expansion, and, where the part presenting the outer passage surface is divided into sections, a simplified geometry for the joints between the sections, which in turn simplifies sealing between the outer part sections.

Also, similarly to embodiments mentioned above, the gas flow passage cross-sectional area will be more concentrated to a central region between blades, which will change the global pressure distribution in an advantageous manner so as to reduce secondary flow losses, especially at the blade roots. In connection thereto it can be mentioned that GB2275308A discloses a gas turbine engine with a fan casing with straight members. However, since the straight members are connected to the outer ends of spokes extending inside the casing in the radial direction, the result is the opposite to that obtained with the second aspect of the invention, namely that the gas flow passage cross-sectional area will be more concentrated to the spokes.

In addition, the concentration of the passage cross-sectional area to a central region between blades will allow for the outer blade ends to be positioned closer to the axis of rotation of the engine. This will provide more space outside the blades, for example for oil conduits or air conduits, and it will also make assembly of the engine easier.

Preferably, two portions of the trace, at said cross-section, of the outer passage surface on either side of the respective blade, are parallel.

DESCRIPTION OF THE FIGURES

Below, embodiments of the invention will be described in detail with reference to the drawings, in which.

DETAILED DESCRIPTION

Figure 1:
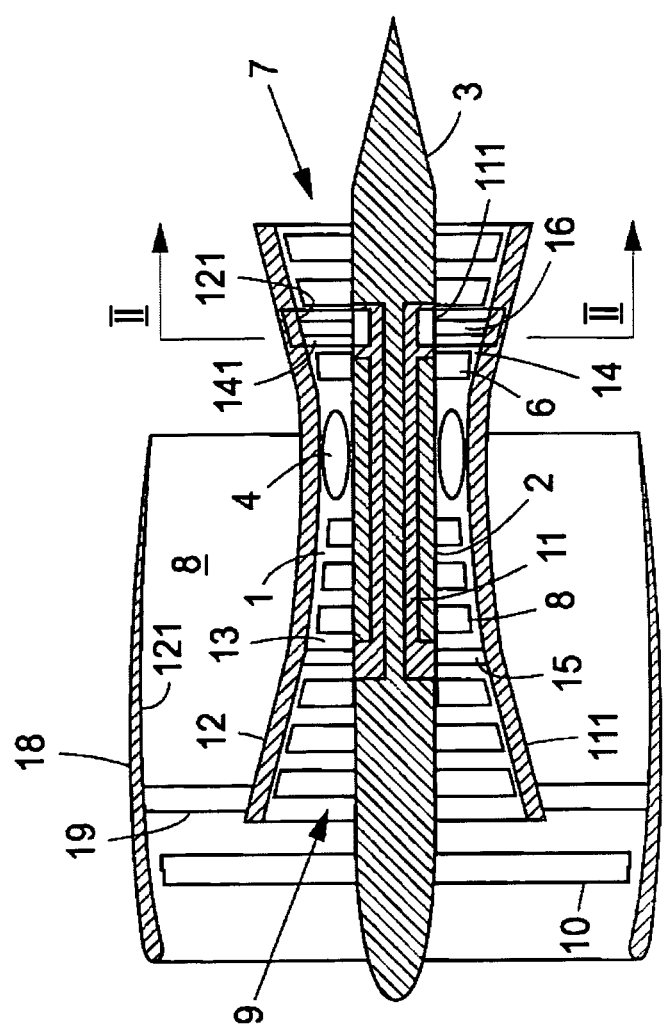
FIG. 1 shows a schematic longitudinal cross-section of a gas turbine engine in the form of a turbofan engine for airplane propulsion.

FIG. 1 shows a schematic longitudinal cross-section of a gas turbine engine in the form of a turbofan engine for airplane propulsion comprising a flow duct 1 adapted to guide a gas flow through the engine. During operation, gas flow through the engine takes place from the left to the right in FIG. 1. The flow duct 1 extends essentially in a longitudinal direction of the engine, and concentrically with a central assembly including two rotatable portions, each in turn including a shaft 2, 3, for the operation of a turbine assembly 6, 7 and a compressor assembly 8, 9, located downstream and upstream, respectively, of a combustion chamber 4.

The turbine assembly 6, 7 comprises an axial high pressure turbine 6, and downstream thereof an axial low pressure turbine 7. The compressor assembly 8, 9 comprises an axial high pressure compressor 8, and upstream thereof an axial low pressure compressor 9. The axial high pressure compressor 8 is adapted to be driven by the axial high pressure turbine 6 by means of one of the shafts 2. The axial low pressure compressor 9 is adapted to be driven by the axial low pressure turbine 7 by means of the other shaft 3. Upstream of the axial low pressure compressor 9 a fan 10 is provided.

The engine also comprises an inner part 11, being a part of the central assembly, and an outer part 12, including a casing for the engine. Between the high pressure turbine 6 and the low pressure turbine 7, and also between the high pressure compressor 8 and the low pressure compressor 9, the inner and outer parts 11, 12 form between them a gas flow passage 13, 14 for the gas flow. In the passages 13, 14 a plurality of blades 15, 16 extend between the inner and outer parts 11, 12. The downstream gas flow passage 14 in FIG. 1 is located between the high pressure turbine 6 and the low pressure turbine 7, and it provides diffusion, i.e. the cross-sectional area of the passage 14 increases in the flow direction, so that the velocity of the gas decreases as it passes the passage 14. As is known in the art, such diffusion provides difficulties in that there is a risk of gas flow separation from delimiting surfaces of the passage 14.

Figure 1A:
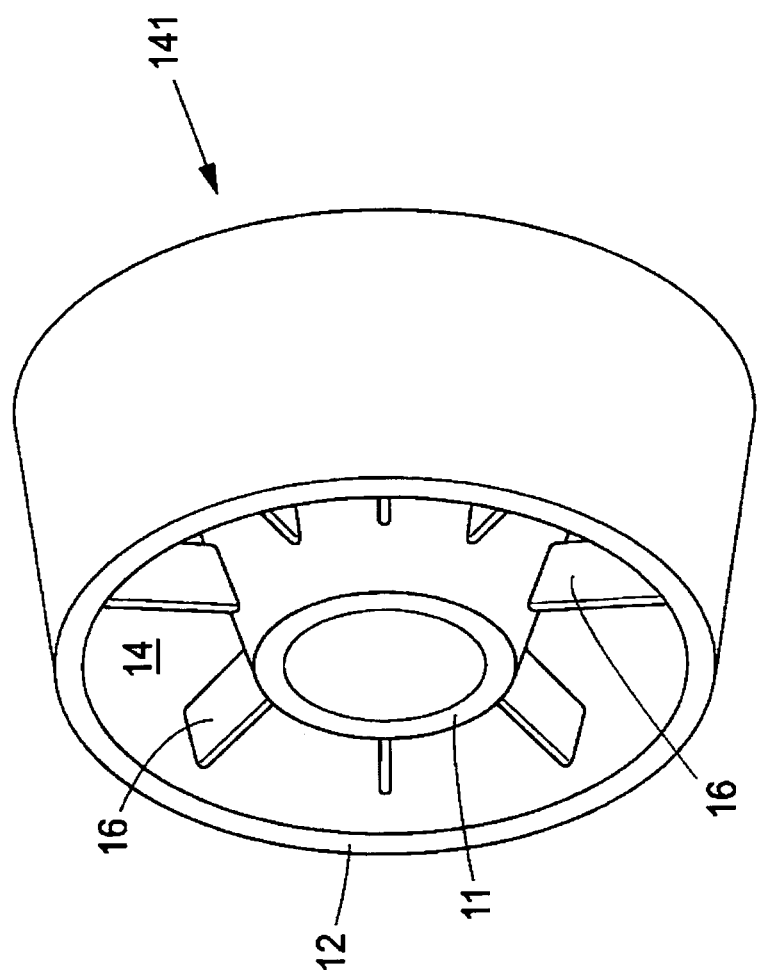
FIG. 1a shows a schematic perspective view of a component of the gas turbine engine in FIG. 1.

The downstream gas flow passage 14 is partly delimited by a gas turbine engine component 141, depicted schematically in FIG. 1a.

Figure 2:
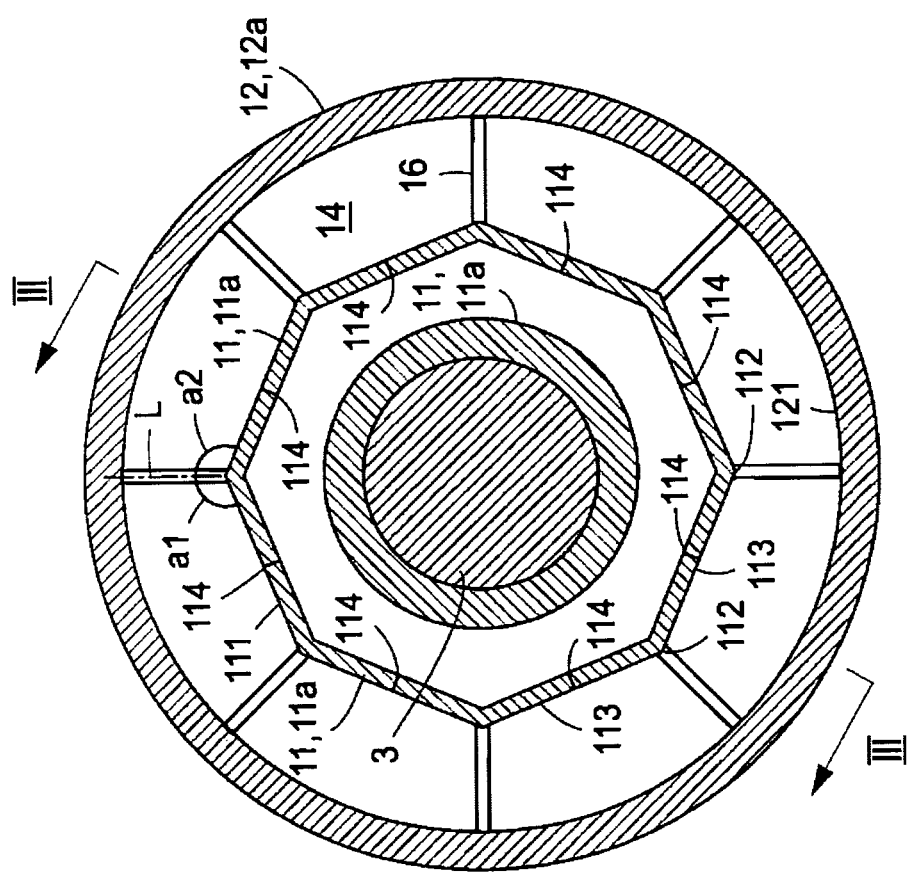
FIG. 2 shows a schematic cross-section of the gas turbine engine, sectioned along the line II-II in FIG. 1.

In FIG. 2, the gas turbine engine component 141 (FIG. 1) providing the downstream gas flow passage 14 can be seen in a cross-sectional view, the section being perpendicular to an axis of the shafts 2, 3 in FIG. 1. In addition to the casing, which has primarily a structural function, the outer part 12 comprises an outer flow delimitation part 12a, shown in FIG. 2, located inside the casing and having primarily a function of participating in the guiding of the gas flow. The inner part 11 comprises an inner flow delimitation part 11a, having primarily a function of participating in the guiding of the gas flow, and an inner structural part 11b (FIG. 11) located inside the inner flow delimitation part 11a. It can be seen that the as flow passage 14 surrounds the inner part 11 so as to present a generally circular cross-sectional shape. It can also be seen that there are in this example eight circumferentially distributed blades 16 in the passage 14. The blades 16 comprises an outer aerodynamically shaped part, and inside thereof a structural part (not shown), whereby the blades work as struts for the inner structural part 11b. Also, the blades 16 are adapted to guide oil conduits etc. The blades 16 in this example are non-lifting, and have a symmetric airfoil cross-section, the chord of which is parallel axis of the shaft 3.

The outer flow delimitation part 12a presents an outer passage surface 121 forming delimitation of the gas flow passage 14. In addition, the inner flow delimitation part 11a presents an inner passage surface 111 forming a delimitation of gas flow passage 14, and which in the cross-section in FIG. 2 has a substantially polygonal shape. Each blade 16 is located at a ridge formed by said polygonal shape of the inner passage surface 111. More specifically, at a trace of the inner passage surface 111 provided at the intersection of the inner passage surface 111 and the plane of the cross-section of FIG. 2, the inner passage surface 111 presents a plurality of crests 112 between which the inner passage surface extends in an substantially straight line 113. Thus, in the direction of the gas flow, the crests presented in cross-sections, such as the one shown in FIG. 2, forms the ridges, at each of which a root of the respective blade 16 is located. It should be noted that at the joints between the blades 16 and the inner and outer passage surfaces 111, 121 fillets could be provided to obtain a smooth transition between the blades 16 and said surfaces 111, 121.

Further, in this example, each blade 16 extends in a radial direction in relation to the axis of the shaft 3. In FIG. 2, a straight line parallel to the spanwise direction of one of the blades 16 is indicated as a broken line L. A first and second angle a1, a2 formed between the straight portions 113 of the inner passage surface 111, on either side of the respective blade 16, and the straight line L parallel to the spanwise direction of the respective blade 16, are both obtuse. As mentioned above, this provides for reducing the risk of flow separation at a region of intersection between the respective blade 16 and the inner passage surface 111. The decreased risk of separation provides in turn for the diffusion of the passage 14 to be increased, which means that the passage can be designed so as to be shorter. This in turn will shorten the length of the engine, which will reduce the weight of it, which of course is desirable in airplane propulsion applications.

The decreased risk of separation provides also provides for the blades to be thicker, and therefore stronger, so that they can be fewer in number in case they serve structural purposes. This is of course advantageous from a manufacturing point of view. Also, thicker blades provides for more space in the blades for servicing conduits and lines, such as oil conduits.

In addition, the polygonal shape of the inner flow delimitation part 11a provides for it to incorporate flat panels between the blades. This means that flat sheet metal can be used for the inner flow delimitation part 11a, providing simple geometric forms, and therefore simple manufacturing processes. In other words, manufacturing of the engine is simplified.

The polygonal shape to the inner passage surface 111, with its straight sections, provides for straight load paths between the blades 16, whereby the radial stiffness of the inner flow delimitation part 11a is increased. In addition, as is known, round shapes used in known solutions favour thermal stresses. The straight sections of the inner passage surface 111 provides for reduced risks of high thermal stresses. Thereby the structural performance of the inner flow delimitation part 11a is increased. Such increase in the structural performance in turn provides for increasing the life of the inner flow delimitation part 11a.

In addition, regardless whether the blades 16 are non-lifting or lifting, the obtuse angles a1, a2 will reduce losses of the aerodynamic performance of each blade, so called endwall related performance losses. The improved aerodynamic performance and efficiency provided by the invention will lower the specific fuel consumption.

The straight portions 113, at said cross-section, of the inner passage surface traces between adjacent crests 112 provide advantages where the part presenting the passage surface 111 is divided into sections, for example as indicated schematically in FIG. 2 with the dividing lines 114, at which sections of the inner flow delimitation part 11a are joined. Specifically, the straight portions 113, provide a simplified geometry for the joints 114, which simplifies sealing between the sections of the inner flow delimitation part 11a. These advantages are specially great where the crests of the inner passage surface form ridges that are oriented in an angle to a plane being parallel with said axis of rotation, such as in the example presented below with reference to FIG. 8.

Figure 3:
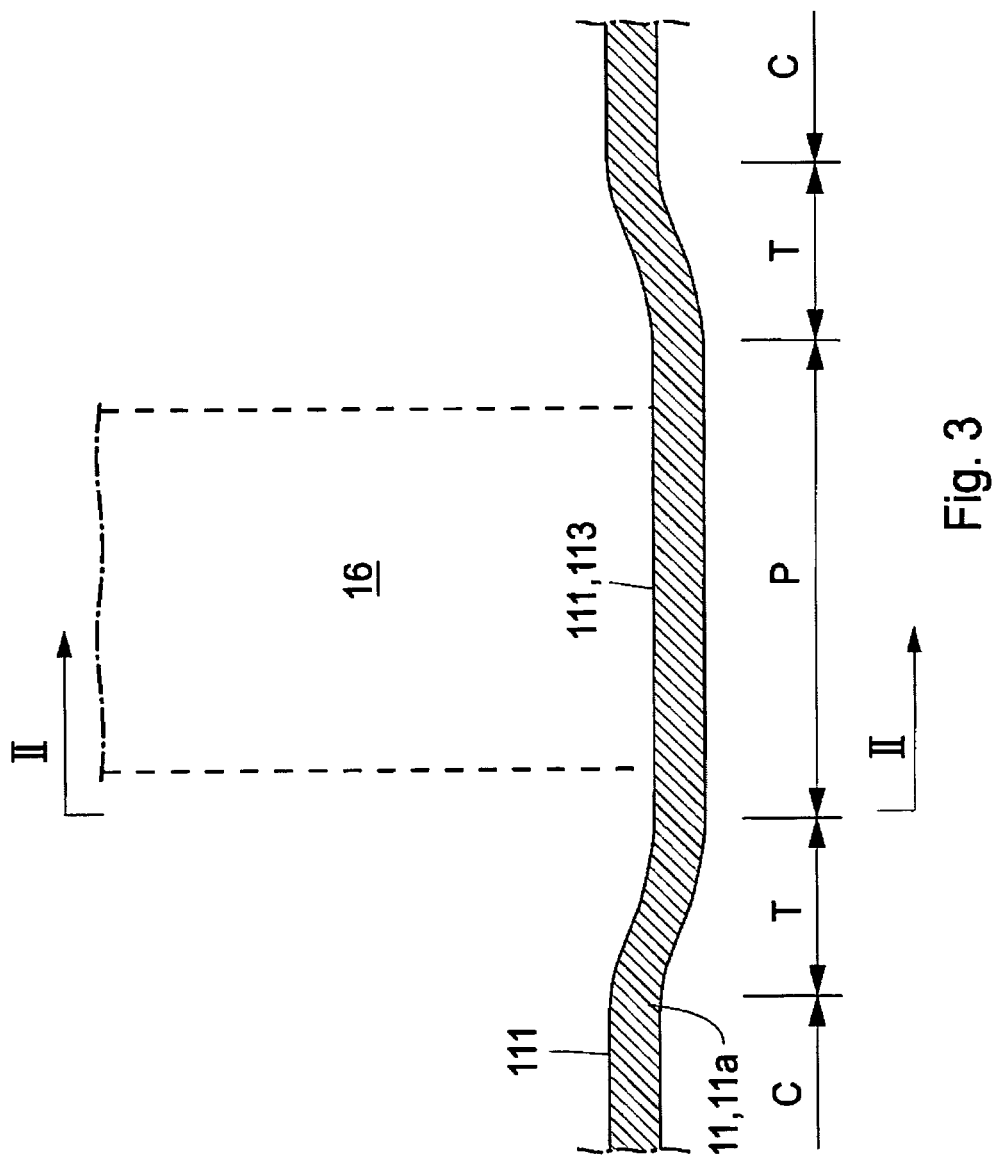
FIG. 3 shows a part of a cross-section oriented along the line III-III in FIG. 2.

Reference is made to FIG. 3 showing a cross-section oriented in parallel to said axis of rotation of the engine. In FIG. 3, sections of the inner passage surface 111, upstream and downstream of the blades 16, with a circular cross-section, are indicated with arrows C. A section with the straight trace portions 113 described above, is indicated with a double arrow P, and extends along the entire blades 16 in the direction of said axis of rotation. Between the section P with the straight trace portions 113, and the sections C with circular cross-sections, transitional sections are provided as indicated in FIG. 3 with double arrows T.

Figure 4:
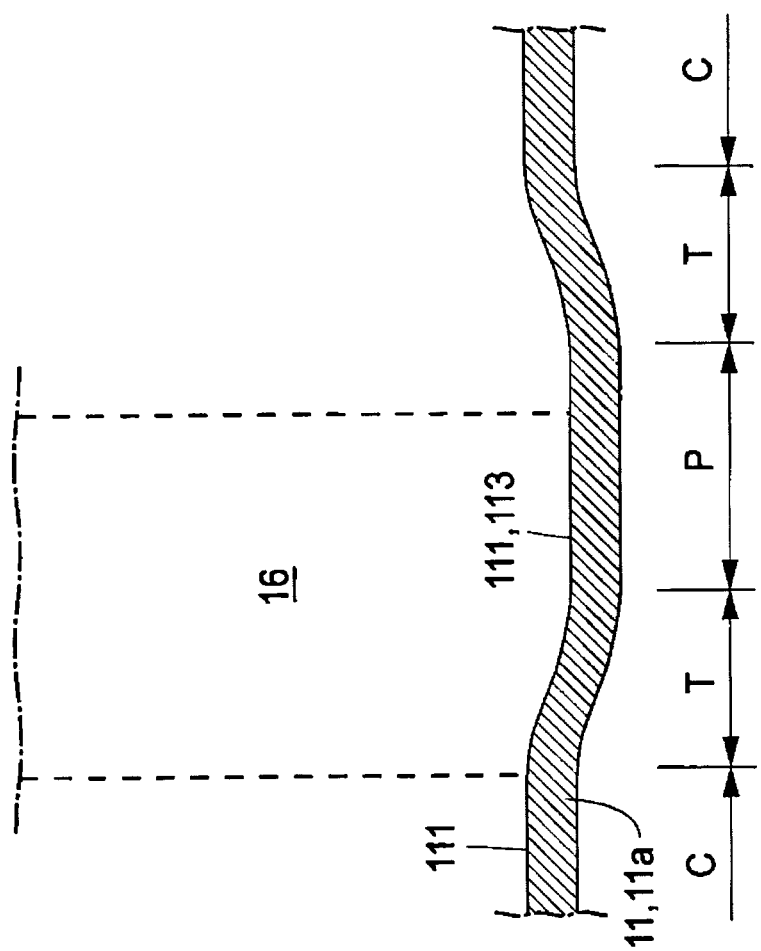
FIG. 4 shows a part of a cross-section, corresponding to the one shown in FIG. 3, in an engine according to an alternative embodiment of the invention, FIG. 5

FIG. 4 shows an alternative to the embodiment in FIG. 3, wherein the section P with the straight trace portions 113 extends only along a portion of the blades 16 in the direction of said axis of rotation. More specifically, in FIG. 4, the section P with the straight trace portions 113 extends along a downstream portion of the blades 16.

Figure 5:
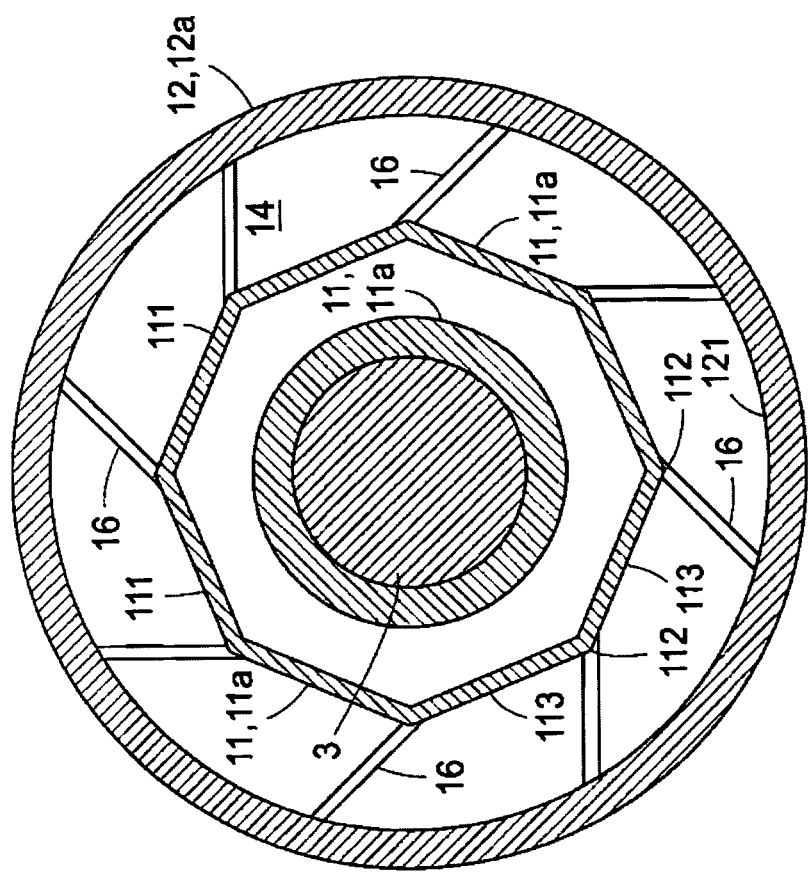
Figure 6:
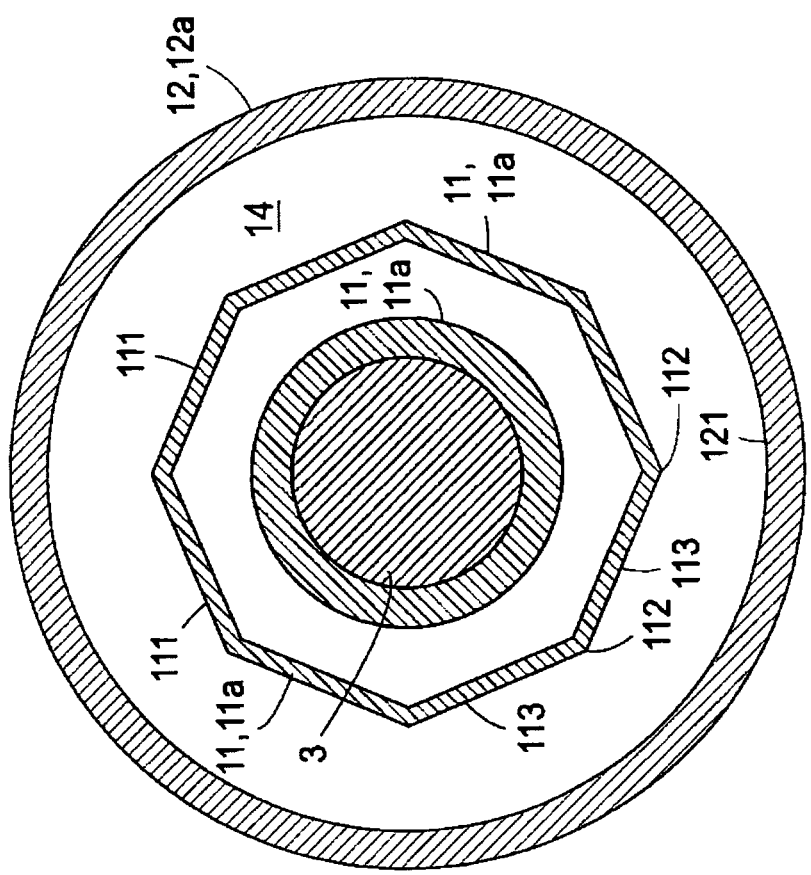

As exemplified in FIG. 5, the invention is also applicable to cases where the blades 16 are oriented in an angle to the radial direction in relation to said axis of rotation of the engine. Further, as exemplified in FIG. 6, the invention is also applicable and advantageous in gas passage portions where there are no blades provided.

Figure 7:
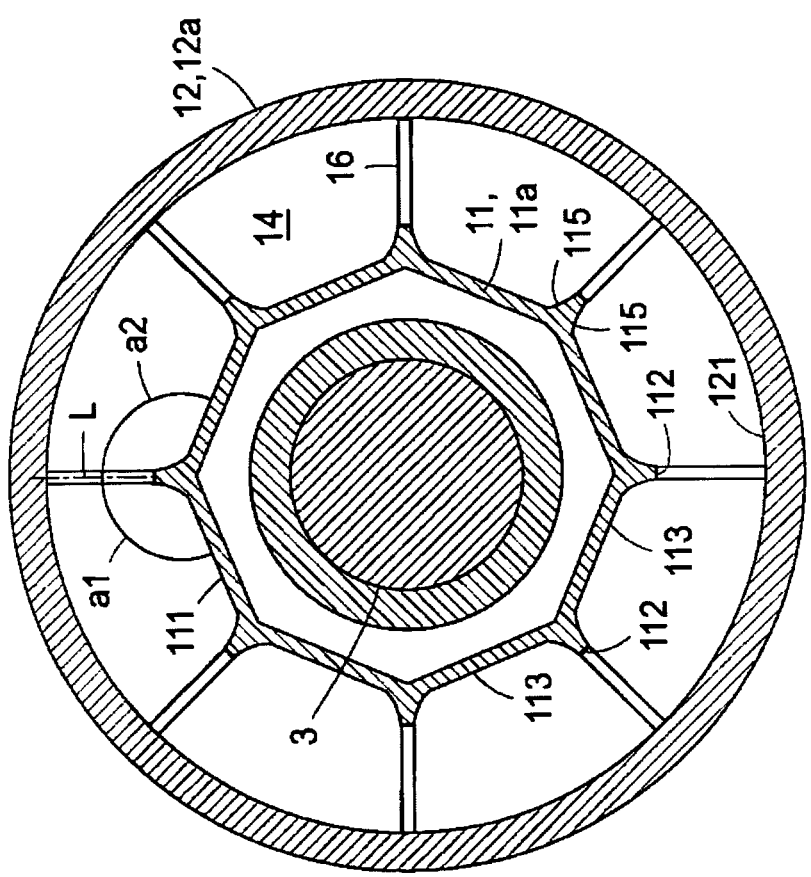
-FIG. 7 shows cross-sections corresponding to the one shown in FIG. 2, in engines according to alternative embodiments of the invention.

Reference is made to FIG. 7. Within the scope of the invention parts of the trace at said cross-section, of the inner passage surface 111 between any of two adjacent crests 112 can be curved, such as portions 115 in FIG. 7 adjacent the blades 16 which are curved in a concave manner. However, preferably, a major part 113 of the trace, at said cross-section, of the inner passage surface 111 between any of two adjacent crests 112 is substantially straight. In FIG. 7 the straight trace parts 113 are located between the curved trace portions 115. In general, at least a portion 113 of the inner passage surface trace, in a cross-section perpendicular to said axis of rotation, between the crests, extends in a substantially straight line.

Figure 8:
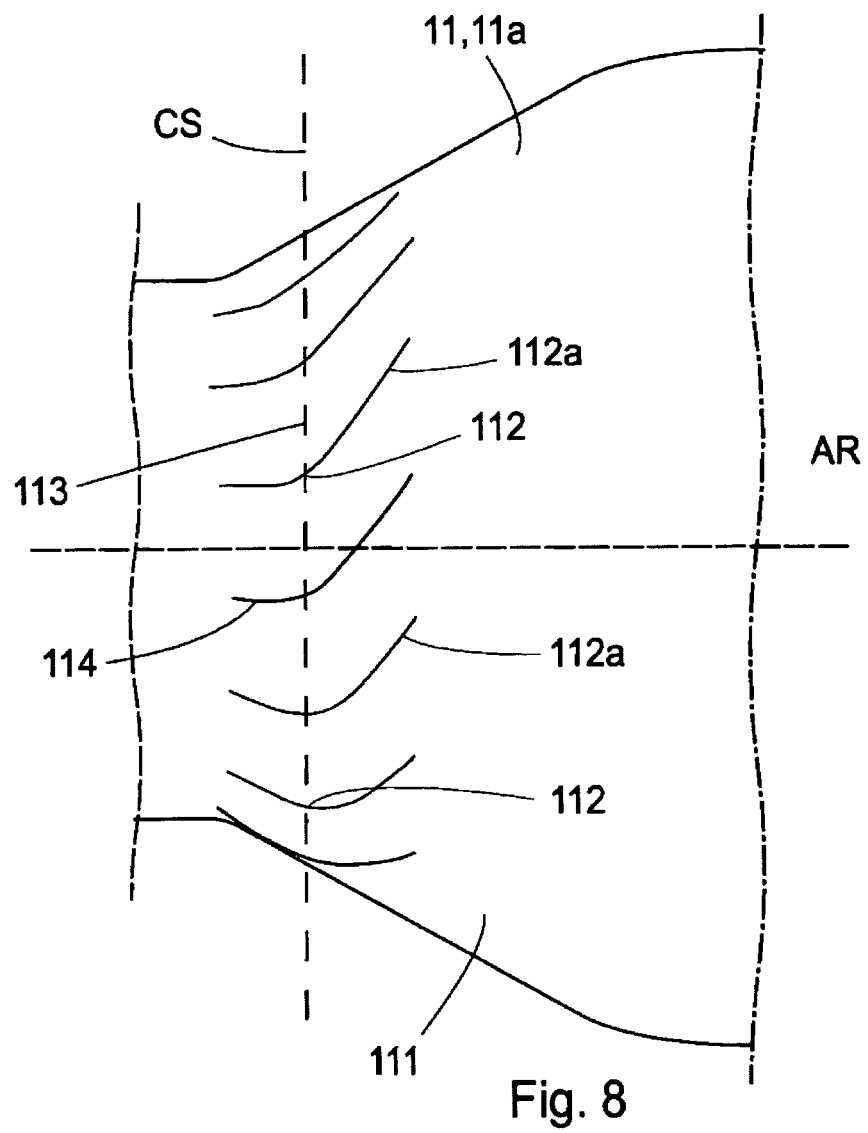
FIG. 8 shows a schematic side view of an inner part of a gas turbine engine according to a further alternative of the invention.

Reference is made to FIG. 8, showing a schematic side view of an inner flow delimitation part 11a of a gas turbine engine, which inner flow delimitation part 11a is adapted to be positioned within an outer flow delimitation part (not shown) as described with reference to FIG. 1 and FIG. 2, so that the inner and outer flow delimitation parts form between them a gas flow passage. In this example, the shapes of the inner flow delimitation part 11a and the outer flow delimitation part 12a are such that the gas flow passage diverges in the direction of the gas flow, i.e. from left to right in FIG. 8. As in embodiments described above, an inner passage surface 111 of the inner flow delimitation part 11a presents, in a cross-section CS perpendicular to an axis of rotation AR of a rotatable portion of the engine, a plurality of crests 112, and a portion 113 of the trace, at said cross-section CS, of the inner passage surface 111 between any of two adjacent crests 112 is substantially straight. In addition, ridges 112a, forming said crests 112 at said cross-section CS, are oriented in an angle to a plane being parallel with said axis of rotation AR. Further, in this example, said ridges 112a are curved so that the angle of the local orientation of the ridges 112a varies in the direction which is parallel to the axis of rotation.

It should be noted that the inner flow delimitation part 11a can advantageously be divided into sections, as mentioned above with reference to FIG. 2, along lines, one of which is indicated with a broken line 114 in FIG. 8, whereby the joints between the inner flow delimitation part 11a sections can follow the orientation of the ridges 112a.

Figure 9:
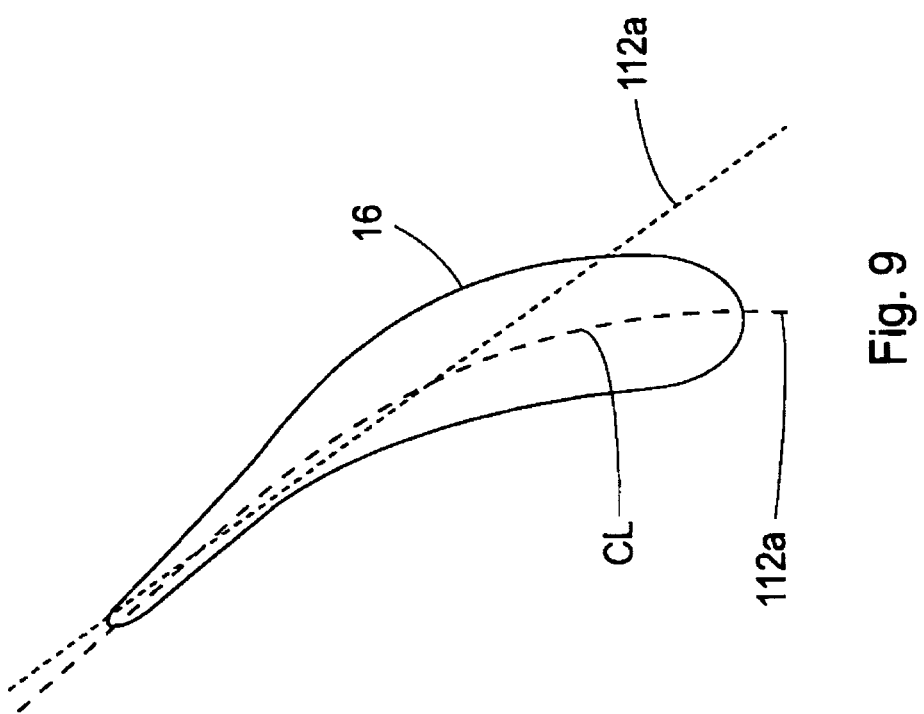
FIG. 9 shows a schematic cross-sectional view of a blade in a gas flow passage of a gas turbine engine.

As depicted in FIG. 9, where blades 16 are provided at the ridges 112a, and the ridges are curved as shown in FIG. 8, the curvature of the ridges 112a, (indicated with a broken line in FIG. 9), can coincide with a center line CL of the blade cross-section. Alternatively, the ridges 112a, oriented in an angle to a plane being parallel with said axis of rotation AR, can be allowed to not follow the center line CL of the blade cross-section. Thereby, the ridges 112a can be straight as suggested by dotted line in FIG. 9. As a further alternative, instead of being provided at the ridges 112a, the blades 16 can be provided at a distance from the ridges.

Figure 10:
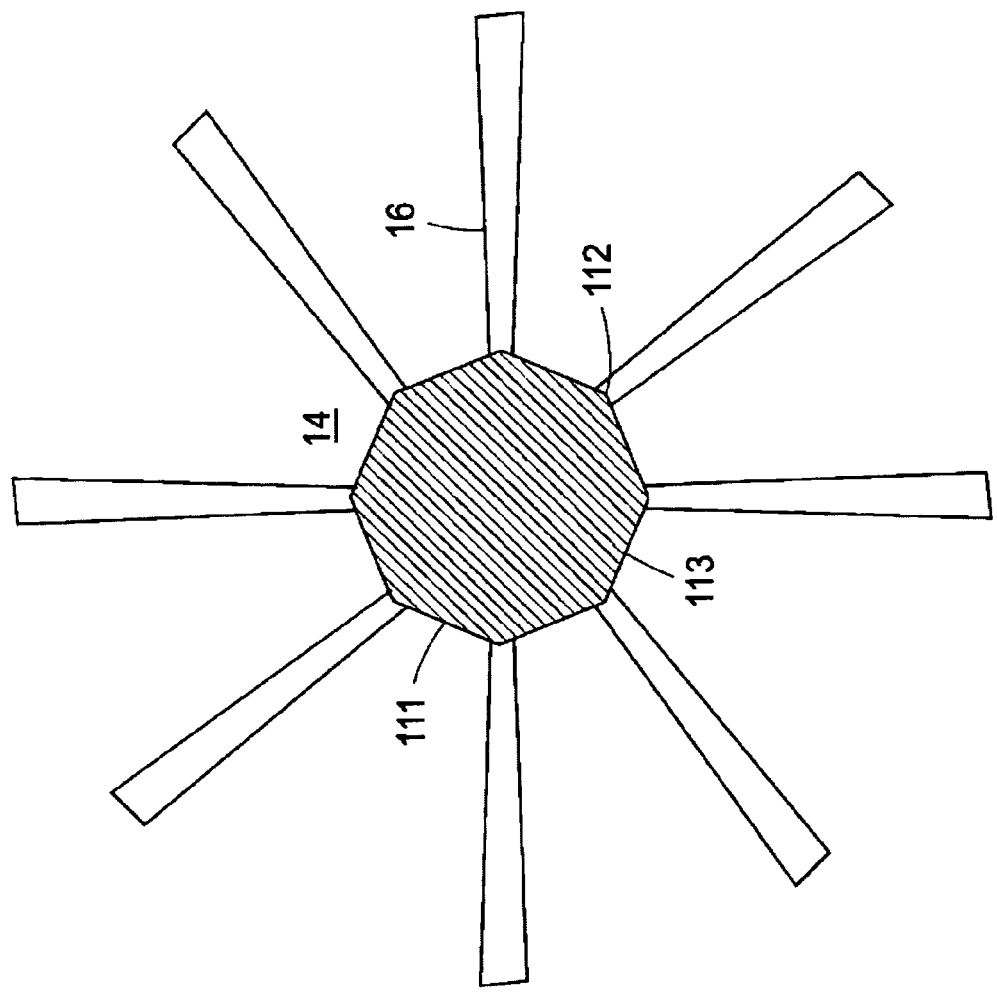
FIG. 10 shows schematic cross-sectional view of a hub for a propeller for a turboprop engine.

As exemplified in FIG. 10, the invention is applicable also where there is no outer part provided as a delimitation of the gas flow passage. FIG. 10 shows an embodiment in which the surface, herein referred to as an inner passage surface 111 is provided as an external surface of a hub for a propeller for a turboprop engine. A plurality of circumferentially distributed blades 16 in the form of propeller blades extend from the inner passage surface 111. Similar to embodiments described above, the inner passage surface 111 presents, in a cross-section perpendicular to an axis of rotation of said engine, a plurality of crests 112, and at least a portion 113 of the trace, at said cross-section, of the inner passage surface 111 between any of two adjacent crests 112 is substantially straight. Also, the respective blades 16 are located at the crests 112.

Figure 11:
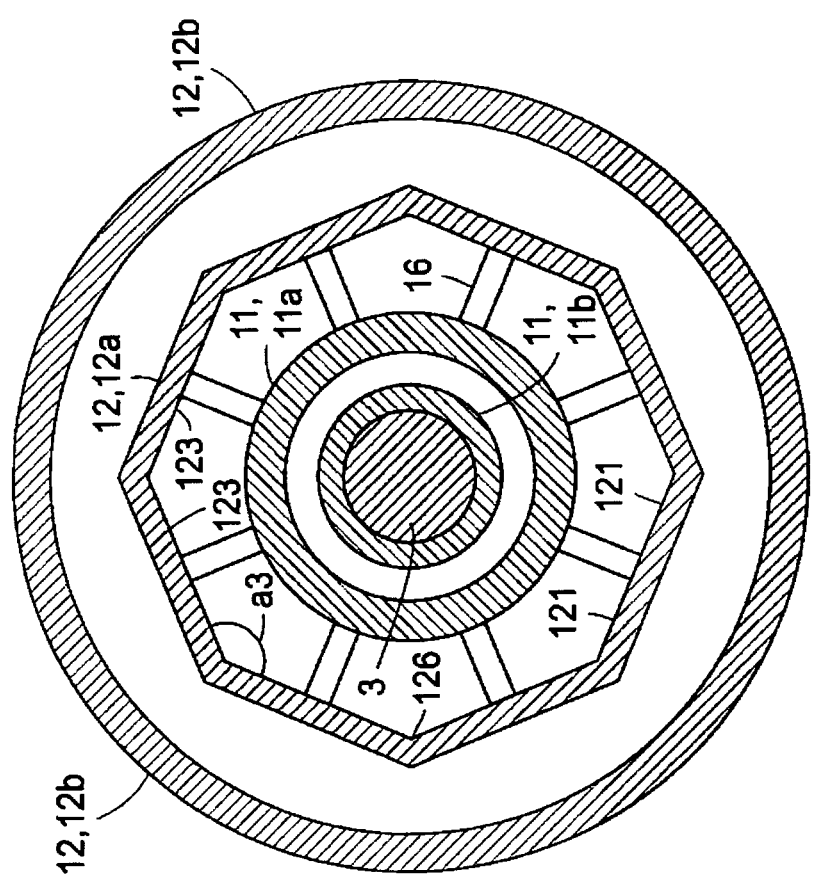
FIG. 11 shows a cross-section corresponding to the one shown in FIG. 2, in an engine according to yet another alternative embodiment of the invention.

As depicted in FIG. 11, the invention is applicable also the outer passage surfaces. FIG. 11 shows an inner part 11 comprising an inner flow delimitation pan 11a and inside thereof an inner structural part 11b, as well as an outer part 12 comprising an outer flow delimitation part 12a and outside thereof a casing 12b, whereby the inner and outer flow delimitation parts 11a, 12a forms between them a gas flow passage 14. A plurality of circumferentially distributed blades 16 extend between the inner and outer part 12, 13. The outer flow delimitation part 12a presents an outer passage surface 121 forming a delimitation, of said gas flow passage 14. Two portions 123 of the trace, at the cross-section of FIG. 11, of the outer passage surface 121 between any of two adjacent blades 16 are substantially straight and oriented in an angle a3 in relation to each other so as to form a concavity in the gas flow passage 14.

Preferably, the two portions 123 of the trace, at said cross-section, of the outer passage surface 121 between any of two adjacent blades, form a major part of the total trace between two adjacent blades.

In FIG. 11, the straight trace portions 123 meet midway between two blades 16 to form a ditch in the form of a sharp corner 126. Alternatively, a ditch in the form of a concave curved trace portion can be provided between the straight trace portion 123. Similarly to what has been described above with reference to FIG. 8 concerning the ridges 112a on the inner passage surface, the ditches 126 can be oriented in an angle to a plane being parallel with the axis of rotation of the engine, and optionally, said ditches 126 can be curved so that the angle of the local orientation of the ditches 126 varies in the direction which is parallel to the axis of rotation. Of course, the ditches 126, can also be parallel with the axis of rotation of the engine.

Whether or not the ditches 126 are sharp or curved, they can serve as locations for weld joints or sealants between adjacent sections of the outer flow delimitation part 12*a*.

As can also be seen in FIG. 11, two portions 123 of the trace, at said cross-section, of the outer passage surface 121 on either side of the respective blade 16, are parallel, In addition, the extensions of these trace portions 123, on either side of the respective blade 16, coincide. It should be noted that the outer passage surface as described with reference to FIG. 11 can of course be combined with an inner passage surface according to any of the embodiments described with reference to FIG. 1-FIG. 9.

Reference is again made to FIG. 1. Between the outer part 12 and an external part 18, a gas flow passage in the form of a bypass channel 8 is provided, through which air is forced by means of the fan 10. Thereby, the outer part 12 has in principle the same gas flow delimiting function as the inner part 11 in the embodiments described above with reference to FIG. 1-FIG. 9, and the external part 18 has in principle the same gas flow delimiting function as the outer part 12 in the embodiments described above with reference to FIG. 1-FIG. 9. Thus, the outer part 12 presents an inner passage surface 111, and the external part 18 presents an outer passage surface 121 forming an outer delimitation of said bypass channel 8. In the bypass channel 8, a plurality of circumferentially distributed blades in the form of struts 19 extend from the inner passage surface 111 to the outer passage surface 121. Thereby, the inner and/or outer passage surfaces 111, 121 can be provided as described above with reference to any of FIG. 1-FIG. 9, or FIG. 11.

It should be noted that in any embodiment of the invention involving blades 16, fillets could be provided at the joints between the blades 16 and the passage surfaces 111, 121 to obtain a smooth transition between the blades 16 and said surfaces 111, 121.

In the description of the embodiments above reference has been made to an engine with two shafts 2, 3. However, the invention is of course applicable to gas turbine engines with other numbers of shafts, for example one or three.

The invention claimed is:

1. A gas turbine engine component, comprising an inner part and an outer part forming between them a gas flow passage, which gas flow passage surrounds the inner part, the inner part presenting an inner passage surface, wherein a trace of the inner passage surface in a cross-section perpendicular to a central axis of the component presents at least one substantially straight portion, wherein a plurality of circumferentially spaced blades extends between the inner part and the outer part and are connected to each one of the inner and outer parts.

2. The gas turbine engine component according to claim 1, wherein inner passage surface presents, in the cross-section, at least two substantially straight trace portions which have different extension directions.

3. The gas turbine engine component according to claim 1, wherein the inner passage surface has a polygonal shape.

4. The gas turbine engine component according to claim 1, wherein a plurality of circumferentially spaced blades extend from the inner passage surface.

5. The gas turbine engine component according to claim 4, wherein at least one of the blades is located at an end point of a substantially straight trace portion.

6. The gas turbine engine component according to claim 5, wherein the at least one straight trace portion of the inner passage surface is provided at all cross-sections, perpendicular to the central axis, along the entire blade in the direction of the central axis.

7. The gas turbine engine component according to claim 4, wherein at least one of the blades is located at a point of intersection between two adjacent substantially straight trace portions.

8. The gas turbine engine component according to claim 7, wherein a first and second angle between respective straight portions, at the cross-section, of the inner passage surface, on either side of the respective blade, and a straight line parallel to the spanwise direction of the respective blade, are both obtuse.

9. The gas turbine engine component according to claim 1, wherein the inner passage surface presents in the cross-section a plurality of crests, and that the at least one substantially straight portion of the trace is positioned between two adjacent crests.

10. The gas turbine engine component according to claim 9, wherein a major part of the trace, at the cross-section, of the inner passage surface between any of two adjacent crests is substantially straight.

11. The gas turbine engine component according to claim 9, wherein ridges, forming the crests at the cross-section, are oriented in an angle to a plane being parallel with the axis of rotation.

12. The gas turbine engine comprising at least one rotatable portion for the operation of a turbine assembly and a compressor assembly, located, in relation to a gas flow through the engine, downstream and upstream, respectively, of a combustion chamber, wherein the engine comprises a gas turbine engine component according to claim 1 and wherein the central axis of the component coincides with an axis of rotation of the rotatable portion.

13. A gas turbine engine component comprising an inner part and an outer part forming between them a gas flow passage, which gas flow passage surrounds the inner part, the inner part presenting an inner passage surface, wherein the trace of the inner passage surface in a cross-section perpendicular to a central axis of the component presents at least one substantially straight portion, wherein the inner passage surface presents in the cross-section a plurality of crests, and that the at least one substantially straight portion of the trace is positioned between two adjacent crests, wherein ridges, forming the crests at the cross-section, are curved so that an angle of the local orientation of the ridges to a plane being parallel with the axis of rotation varies in the direction which is parallel to the axis of rotation.

14. A gas turbine engine component adapted to provide a gas flow passage for at least a part of a gas flow through the gas turbine engine, which gas flow passage surrounds an inner passage surface, an outer passage surface forming an outer delimitation of the gas flow passage, a plurality of circumferentially spaced blades extending between the inner and outer passage surfaces, wherein two portions of a trace, in a cross-section perpendicular to a central axis of the component, of the outer passage surface between two adjacent blades are substantially straight and oriented in an angle in relation to each other so as to form a concavity in the gas flow passage.

15. The gas turbine engine component according to claim 14, wherein two portions of the trace, at the cross-section of the outer passage surface on either side of the respective blade, are parallel.

16. The gas turbine engine component according to claim 14, wherein the straight trace portions of the outer passage surface are provided at all cross-sections, perpendicular to the central axis, along the entire blades in the direction of the central axis.

17. The gas turbine engine component according to 14, wherein the two portions of the trace, at the cross-section of the outer passage surface between any of two adjacent blades, form a major part of a total trace between two adjacent blades.

18. The gas turbine engine component according to claim 14, wherein ditches, each formed between two straight trace portions between any of two adjacent blades, are oriented in an angle to a plane being parallel with the axis of rotation.

19. The gas turbine engine component according to claim 14, wherein ditches, each formed between two straight trace portions between any of two adjacent blades, are curved so that an angle of the local orientation of the ditches to a plane being parallel with the axis of rotation varies in the direction which is parallel to the axis of rotation.

* * * * *